March 20, 1934.  B. A. KOLOC  1,951,938
TRACTOR
Filed June 30, 1930
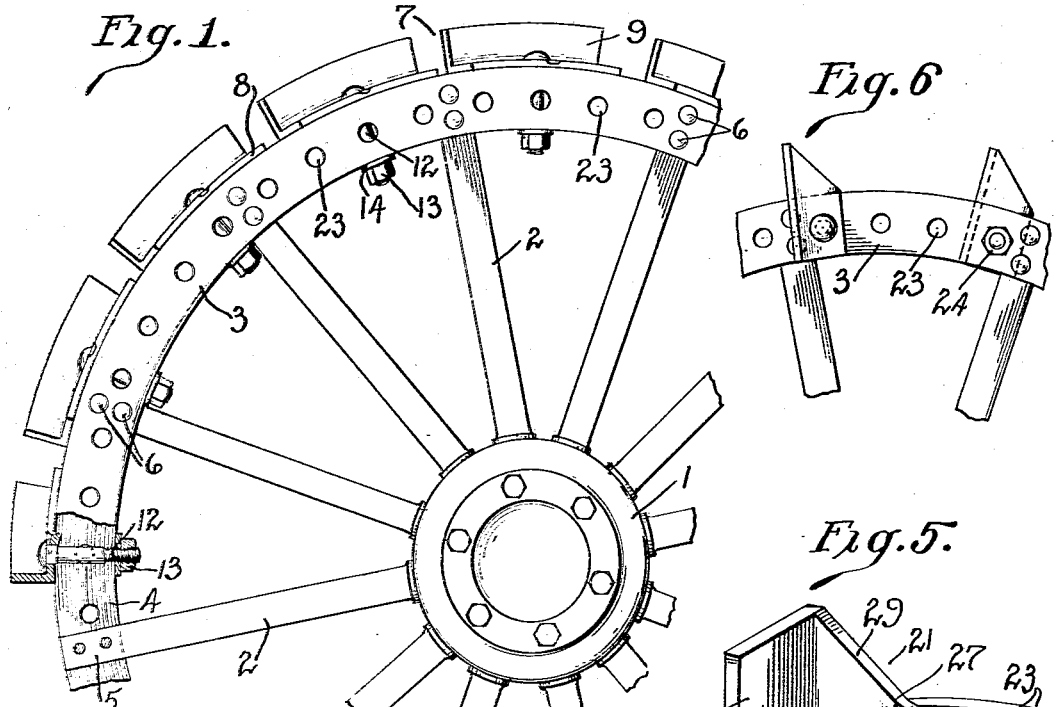
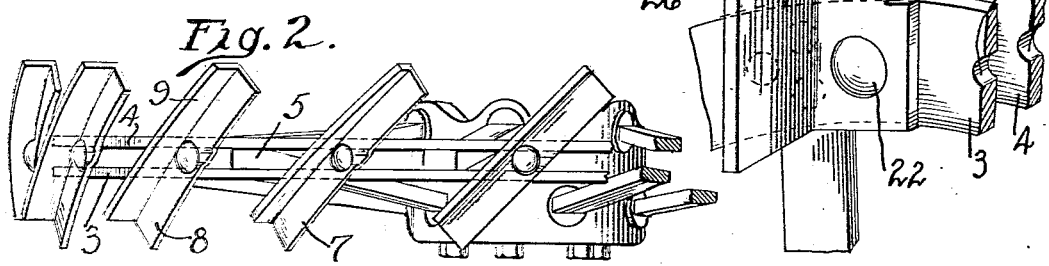
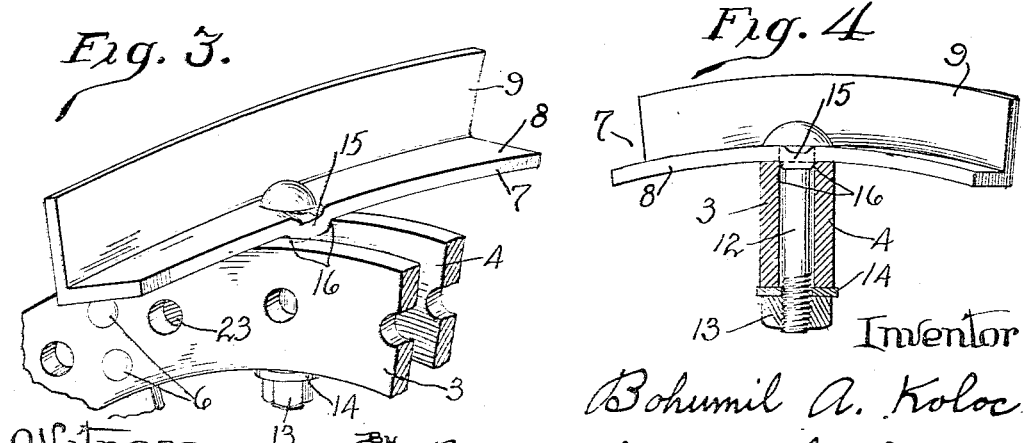
Inventor
Bohumil A. Koloc
By Brown, Jackson, Boettcher & Diemer
Attorneys
Witness
Milton Lenoir Patented Mar. 20, 1934

1,951,938

UNITED STATES PATENT OFFICE 1,951,938

TRACTOR

Bohumil A. Koloc, Waterloo, Iowa, assignor to John Deere Tractor Company, Waterloo, Iowa, a corporation of Iowa Application June 30, 1930, Serial No. 464,751

6 Claims. (Cl. 301—44)

The present invention relates to traction wheels and more particularly to those types of wheels which are used on vehicles where great tractive effort is required.

It is the practice in the manufacturing of wheels for tractors or the like to provide a wheel with a wide flat rim into which spokes extend and are secured therein. This wheel is usually made of steel and necessarily adds great weight to the implement. It is the usual custom to provide traction lugs on the outer surface of this rim to prevent slipping of the wheel in soft or wet earth. This type of wheel is satisfactory under favorable earth conditions and in certain localities, but when used in some sections of the country where the ground is unusually sticky and gummy, the space between these traction lugs will become filled and packed with earth, the solid rim acting to retain the packed soil. This will result in lost tractive effort and allow the wheels to slip. Furthermore, when the wheels become packed with soil an added load is imposed on the motive power.

The principal object of my invention is to provide an improved traction wheel which is light and strong and which does not have the usual flat rim, thus preventing the accumulation of soil between the lugs as on the older types of wheels. This wheel may comprise a light weight open skeleton wheel so as to provide a minimum surface upon which gummy soil will adhere and upon this skeleton frame-work traction lugs may be secured to aid in gripping the ground. In case soil does stick to the lugs it cannot pack between them and the rim but will drop from the wheel as it turns a complete revolution because there is no solid rim against which the soil can pack.

It is also the purpose of this invention to provide a novel traction cleat which can be easily assembled on a skeleton type wheel and which provides effective tractive engagement with the ground.

Another purpose of this invention is to provide a wheel that can be easily and cheaply manufactured, and have a minimum number of parts and still provide a rigid and substantial construction.

Other purposes and advantages of the invention will appear in the following description, reference being had to the accompanying drawing.

Figure 1 is a fragmentary side elevational view of the improved wheel, part of the outer side rings being broken away;

Figure 2 is a top plan view of the wheel with parts broken away as shown in Figure 1;

Figure 3 is a perspective view of a novel type of lug used in conjunction with my novel wheel;

Figure 4 is an enlarged cross sectional view showing details of the method of securing the cleat on the wheel;

Figure 5 is a modified form of traction cleat which may also be used in conjunction with my novel type of wheel; and Figure 6 is a side view of the traction cleats of the type shown in Figure 5, showing two cleats mounted on the wheel.

Referring now to the drawing, and more particularly to Figure 1, the wheel is composed of a hub indicated at 1 with spokes 2 cast integrally with the hub or secured thereto in any desired manner. The spokes 2 are preferably of rectangular cross-section, although it is apparent that they could be round and flattened at their ends to provide a flat surface against which the rings 3 and 4 of the rim are secured, if desired. Neither the method of securing these spokes to the hub, nor the construction of the hub forms a part of this invention.

A pair of narrow rings 3, 4 are secured to either side of the ends 5 of the spokes 2 and are secured directly thereto by rivets or bolts 6, or the like. These rings 3, 4 are separated only by the thickness of the spokes 2 and form a minimum surface for the retention of soil. This factor is especially important when the implement is used on a gummy and sticky soil where the usual type of tractor wheel having the usual rim and cleats would pick up the soil and pack the same between the cleats until it would lose its tractive engagement with the ground and slip, and at the same time such a wheel laden with soil will be very heavy and create an unnecessary strain upon the motive power of the implement. It will be noted that the size and weight of the rings and spokes may be increased or decreased to adapt it to meet the demands of different types of implements without materially changing the design of the wheel.

Traction lugs 7 are distributed equidistantly around the outer periphery of the rings 3, 4. These lugs 7 are preferably made of angle iron and comprise a base portion 8 with a flanged side wall 9. The lugs 7 are securely fixed to the rings 3, 4 by bolts 12 which extend inwardly toward the center of the wheel and between the rings 3, 4. Preferably, the rings 3 and 4 are spaced apart by the spokes just enough to receive the bolts 12. The nut 13 is drawn against the washer 14. The washer, in turn, contacts with the inside periphery of the rings 3, 4, and thereby provides a better seat against which the nut abuts than would be the case if the nut contacted directly with the rings.

A projection 15 is punched, pressed, or otherwise formed in the base of the lug and extends below base 8 as viewed in Figures 3 and 4. This projection is formed at an angle to a cross section taken through the center of the lug so that when the lug is asembled on the wheel the projection 15 will be received between the rings 3, 4 to hold the lugs 7 diagonally of the rings 3, 4, as best shown in Figure 2. The bolts 12 preferably pass through the projections 15, and the projections form inclined shoulders, as at 16, which are wedged between the inner faces of the periphery of the rings 3, 4 to prevent the lugs from turning on the rings. Each lug 7 is arcuate in shape, see Figure 4, longitudinally thereof so that when installed on the wheel the outer periphery of the lugs lies in the surface of a cylinder having its axis at the center of the hub 1.

In Figures 5 and 6 a modified form of traction lug or cleat is disclosed. In these figures 21 indicates the lug as a whole, this lug comprising a side wall or member 25 having a wing member or flanged portion 26 disposed at a right angle thereto. The rim is comprised of spaced narrow rings 3 and 4 and each lug has an off-set portion 27 which forms a tang that abuts against the outer periphery of one of the rings to prevent turning of the lug about the bolt 22. The tang may be formed by means of any suitable tool or it may be formed through the use of appropriate dies in a punch press which would stamp or press the tang out of the lug member. The lug is secured to one side of the rim by bolt 22 which passes through holes 23 in both rings 3, 4 and is tightened by nut 24 on the opposite side thereof. These lugs are assembled in a staggered relation around the wheel, the lugs being alternately secured to opposite sides of the rim as shown in Figure 6. Preferably a number of holes 23 are provided in the rings 3 and 4 so that a different number of lugs may be employed if desired.

While I have disclosed in connection with the accompanying drawing the preferred embodiment of my invention, it is to be understood that my invention is not to be limited to the specific structure shown and described, but in fact, widely different means may be employed in the practice of my invention as defined in the appended claims.

What I claim, therefore, and desire to secure by Letters Patent is:

1. In a wheel of the class described, the combination of a wheel having spokes radiating outwardly from a common hub, the outer ends of said spokes being disposed in the median plane of the wheel, a pair of laterally spaced rings disposed on the ends of said spokes and adapted to carry a plurality of traction lugs, each of said lugs being formed from angle iron having a base portion, said base portion having a tang pressed therefrom and adapted to be received between said spaced rings and a bolt passing through said tang projection and abutting the adjacent sides of said rings, said tang projection and said bolt preventing relative movement of the traction lug on the rings.

2. In a wheel of the class described, the combination with a hub having spokes radiating outwardly therefrom, of a pair of spaced rings mounted upon the outer ends of said spokes, traction lugs secured on the outer periphery of said rings, each of said lugs being arcuate in form, the outer portion of each of said lugs lying in a circle having the central portion of said hub as its axis, and a depression in the central portion of each of said lugs adapted to be disposed between said rings, said depressions extending diagonally across said lugs.

3. A traction lug of the class described comprising an arcuate body having a base, said base having an intermediate continuous portion thereof deformed out of the general plane of the base to provide a projection thereon, said projection being disposed at an angle to the central transverse plane of the lug.

4. A traction lug of the class described comprising an arcuately formed member having a base and an earth engaging element extending from one edge thereof, said base having a central opening therein for the reception of fastening means, and having a portion of the other edge thereof deformed to provide a tapered projection thereon, said tapered projection being formed with its greatest dimension coincident with said other edge of the base.

5. A traction lug of the class described comprising an angle iron having a portion thereof adapted for engagement with the ground and having another portion thereof constituting a base for attachment with a wheel, said base having a central opening for the reception of fastening means, and having a portion thereof adjacent said opening deformed out of the general plane of the base to form a tapered projection on said base, the highest part of said projection being disposed farthest away from said central base opening.

6. In a traction wheel, the combination of a narrow rim constituting two flat parallel rings spaced apart by a plurality of spokes, a plurality of lugs each provided with securing means for attaching said lugs to said rim in positions between adjacent spokes, said lugs each having a pair of oppositely related slightly tapered shoulders formed thereon for engagement between said rings whereby the shouldered portion of said lug is wedged between the rings to cooperate with said securing means to prevent said lug from turning upon the rim.

BOHUMIL A. KOLOC.